W. M. FOLBERTH
WINDSHIELD CLEANER.
APPLICATION FILED DEC. 29, 1919.
1,424,890.
Patented Aug. 8, 1922.
3 SHEETS—SHEET 2.
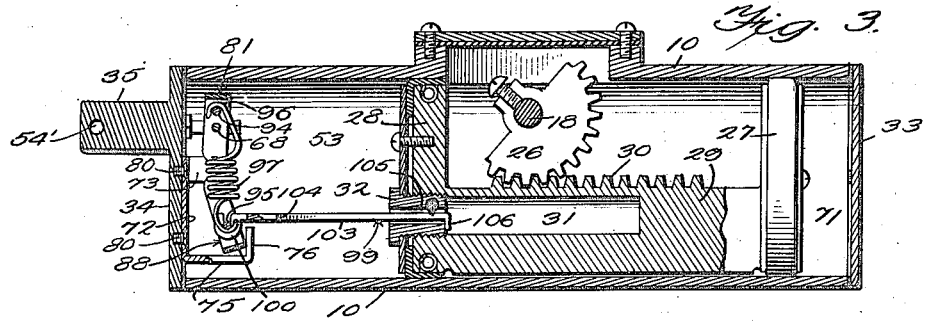
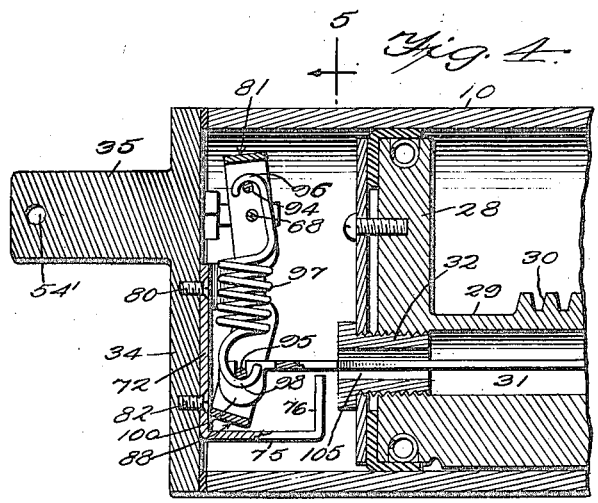
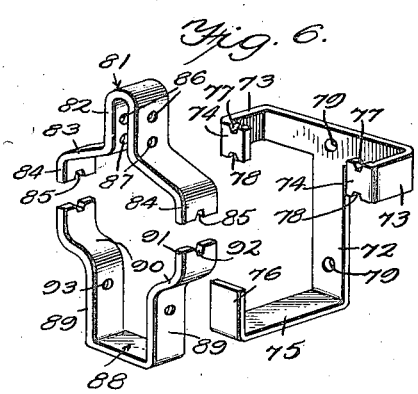
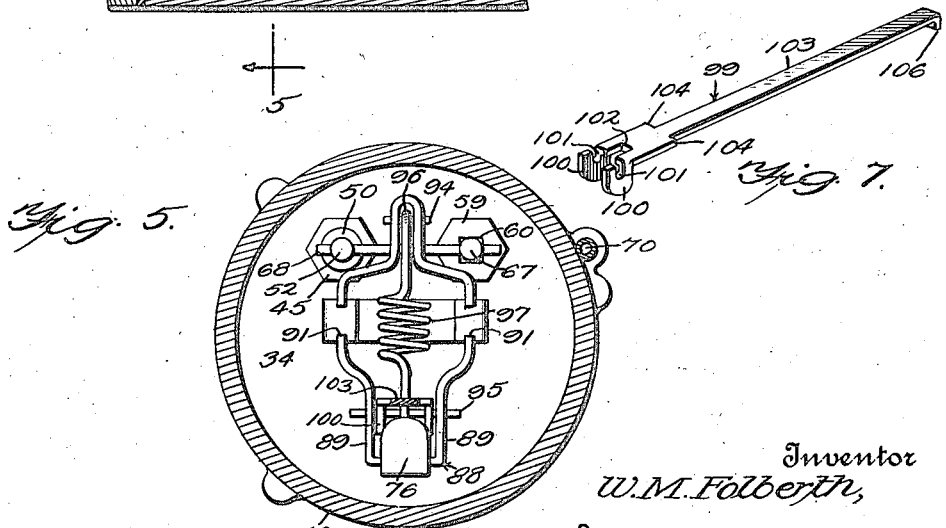
Inventor
W. M. Folberth,
By
Attorney

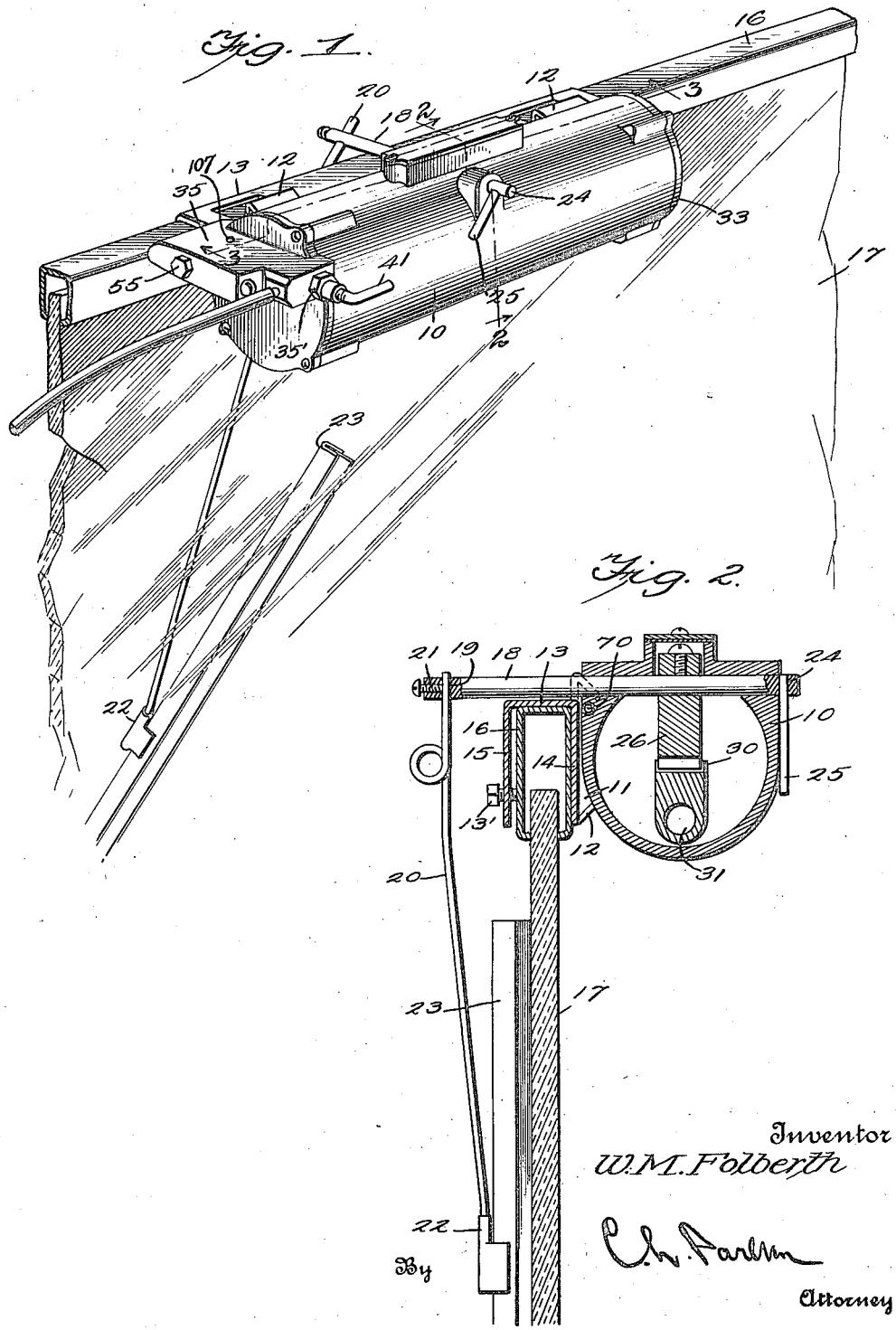

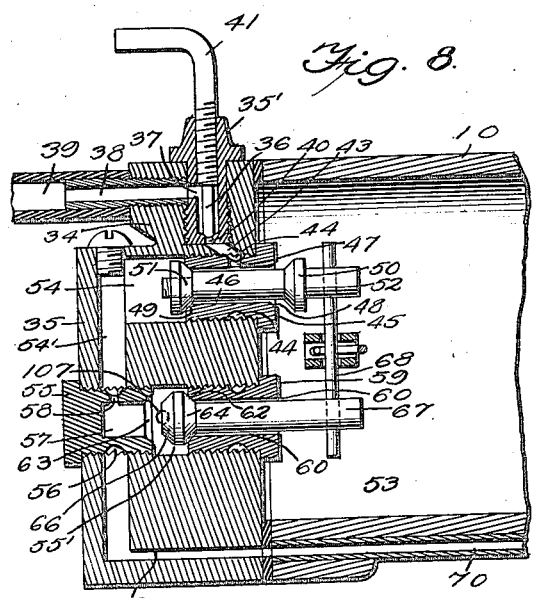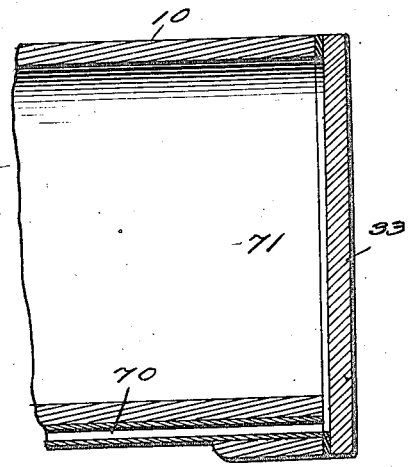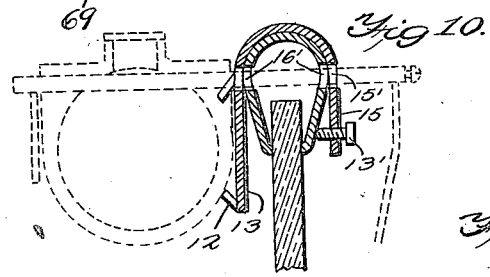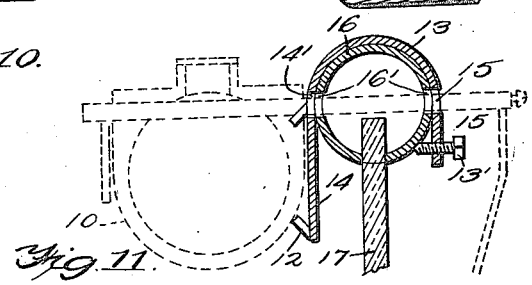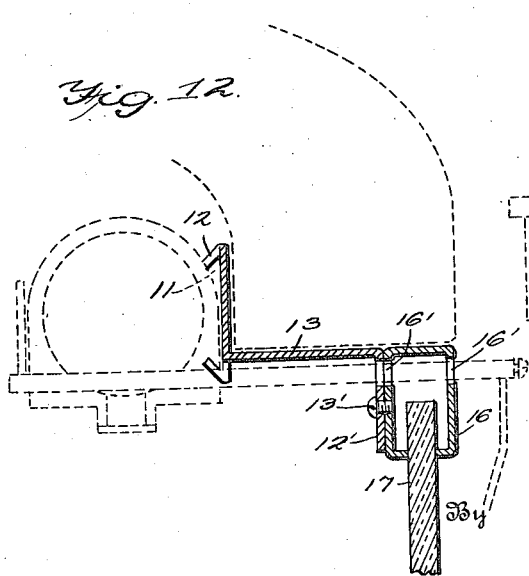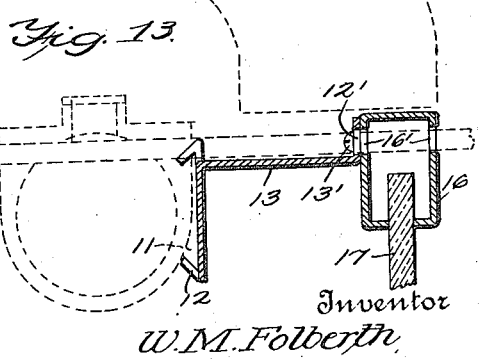

UNITED STATES PATENT OFFICE.

WILLIAM M. FOLBERTH, OF CLEVELAND, OHIO.

WINDSHIELD CLEANER.

1,424,890.  Specification of Letters Patent.  Patented Aug. 8, 1922.

Application filed December 29, 1919. Serial No. 348,175.

*To all whom it may concern:*

Be it known that I, WILLIAM M. FOLBERTH, a citizen of the United States, residing at Cleveland, in the county of Cuyahoga and State of Ohio, have invented certain new and useful Improvements in Windshield Cleaners, of which the following is a specification.

This invention relates to improvements in windshield cleaners and more particularly to motors and valve operating mechanism therefor.

An important object of the invention is to provide an automatically operated windshield cleaner motor.

In windshield cleaners of the above character the operating means for the cleaner is generally situated upon the outer face of the windshield. When in this position the operating motor is subjected to the action of the elements and in cold weather the lubricant used has a tendency to stiffen and interfere with the operation of the motor. This difficulty is particularly noticeable in starting the motor.

I have provided a motor for operating a windshield cleaner which is adapted to be placed interiorly of the windshield and operate the windshield cleaner exteriorly of the window, this operation being afforded by a rock shaft which extends either through the windshield or above the same. I have furthermore provided means whereby the cleaner may be started or may be operated manually in event the source of power by which the motor is actuated becomes inaccessible or the motor itself becomes inoperative. This construction, while disclosed in the present application, forms the subject matter of a divisional application filed March 11, 1922, Serial No. 543,063, and the claims of the present application are directed to the motor and valve mechanism therefor.

A further object of the invention is to provide a novel attaching means whereby the cleaner operating motor may be attached to the windshield.

In a copending application Serial No. 327,052, filed September 29, 1919, I have disclosed a similar construction, but the claims in the said application are directed to the construction of the cleaner motor. In the present application, I do not claim the motor construction, but claim the valve operating mechanism actuated by the movement of the piston.

Other objects and advantages will be apparent throughout the course of the following description.

Referring now more particularly to the drawings, wherein for the purpose of illustration is shown a preferred embodiment of my invention and wherein like numerals designate like parts throughout.

Figure 1 is a perspective view of my windshield cleaner attached to the windshield of an automobile.

Figure 2 is a transverse section on line 2—2 of Figure 1.

Figure 3 is a longitudinal section on line 3—3 of Figure 1.

Figure 4 is an enlarged fragmentary section similar to that shown in Figure 3.

Figure 5 is a section taken on the line 5—5 of Figure 4.

Figure 6 is a combined perspective of the plates forming a portion of the valve operating mechanism.

Figure 7 is a perspective of the valve operating lever.

Figure 8 is an enlarged fragmentary section taken at right angles to that shown, in Figure 4.

Figure 9 is an enlarged section of the opposite end of the cylinder, and

Figures 10, 11, 12 and 13 show modified forms of attaching brackets by means of which the cylinder may be secured to windshields of different construction.

Referring now more particularly to the drawings the numeral 10 indicates a cylinder provided upon one side with angular shoulders 11. These shoulders 11 receive corresponding angular ears 12 formed upon one side 14 of the bracket 13.

The bracket 13 comprises in general a U-shaped member the opposite sides 14 and 15 of which are adapted to be disposed upon opposite sides of a suitable support, such as framing 16 which holds the windshield glass 17 in position. The bracket may be held against shifting with relation to the framing 16 by means of retaining screws 13' or the like.

In the forms shown in Figures 10 and 11 the bracket retains substantially the same form as that shown in Figures 1 and 2 with the exception of the fact that the base of the U is somewhat rounded. It will be obvious that in some makes of cars it is not desirable to have the operating shaft of the cleaner extend above the upper surfaces of the framing 16. In each of the forms shown in Figures 10 to 13 inclusive the operating shaft 18 extends through the framing 16 openings 14' and 15' being formed in the arms 14 and 15 of the bracket and opening 16' being formed in the framing 16 of the windshield. In the forms shown in Figures 12 and 13 this construction is slightly deviated from in that the bracket has but a single arm 12' which is secured to the interior of the framing 16.

The operating shaft 18 is mounted for oscillation in the cylinder 10 and is provided in its outer end with the transverse bore 19 which receives a cleaning bar 20, the bar being held in position in the bore by means of the set screw 21 or the like. The lower end of the cleaner bar 20 is provided with a cleaning element holder 22 adapted to receive a cleaning element 23. These parts are shown in the present disclosure as being similar to those shown and described in my copending application Serial Number 325,873 filed September 24th 1919. The inner end 24 of the shaft 18 extends beyond the inner side of the cylinder 10 and is provided with a transversely disposed operating arm 25 by means of which the shaft may be manually oscillated.

Mounted upon the rock shaft 18, within the cylinder 10, is a segmental gear 26 secured to the rock shaft in any desired manner. Slidably arranged within the cylinder are a pair of spaced pistons 27 and 28 connected by a member 29. This member 29 is provided upon one side thereof with a rack 30 which engages the segmental gear 26 and has a longitudinal bore 31 threaded at its outer end to receive an externally threaded plug 32 for a purpose hereinafter to appear.

The ends of the cylinder are closed by removable heads 33 and 34, the head 34 being provided with an extension 35. A plug 35' is provided having threaded engagement with the extension 35 and having formed therein a longitudinal port 36. The longitudinal port 36 communicates with a transverse port 37 which in turn communicates with the internal bore 38 of a tubular member to which is attached a conduit 39 connected with a suitable source of suction as for example the intake manifold of the engine or a vacuum tank forming a portion of the fuel feed of the engine. The port 36 is provided with a seat 40 which is normally closed by a needle valve 41.

This port communicates with the conduit 43 formed in the extension 35 and the conduit 43 in turn communicates with a groove 44 formed in a plug 45 having threaded engagement with the extension of the head 34. The plug 45 is provided with a longitudinal bore 46 connected with the groove 44 by means of a transverse passage 47.

Formed upon opposite ends of the plug 45 are valve seats 48 and 49 adapted to receive valves 50 and 51 respectively having a common stem 52. One end of the passage 46 of the plug 45 communicates with the interior of the cylinder at the end 53 thereof and the other one communicates with the conduit 54. This conduit 54 in turn communicates with the conduit 54' extending longitudinally of the head 34.

The conduit 54' is interrupted by a plug 55 having an annular groove 56 alining with the conduit and a central bore 57 formed in the end thereof adjacent the end 53 of the cylinder. The groove 56 and bore 57 of the plug are connected by means of a passage 58.

The bore 55' in which the plug 55 is seated extends entirely through the extension 35 and head 34 and is provided upon its inner end with screw threads to receive an externally threaded plug 59 having a longitudinal bore extending throughout the length thereof as at 60. The outer end of the plug 59 and the inner end of the plug 55 are each provided with a seat, these seats being designated by the numerals 62 and 63 respectively. The seats 62 and 63 receive valves 64 and 66 respectively having a common stem 67 extending through the bore 60 of the plug 59. The stems 52 and 67 of the valves are connected by a transverse member 68 to operate in unison.

The end of the bore 54' communicates with the bore 69 extending in a direction longitudinally of the cylinder. This bore in turn communicates with the conduit 70 which opens at the end 71 of the cylinder.

Secured to the inner face of the head 34 is a substantially T-shaped plate 72 having upstanding portions 73 formed at the end of each arm of the head of the T. These upstanding portions terminate in portions parallel to the main body of the plate as at 74. That portion of the plate forming the stem of the T is also provided with an upstanding portion 75 having a portion 76 at the free end thereof parallel to and extending over the main body of the member 72. The portions 74 are provided upon opposite sides thereof with notches 77 and 78 for a purpose presently to appear. The plate 72 may be secured to the head 34 in any desired manner. As shown, an opening 79 is provided in the plate 72 for the reception of screws 80 having threaded engagement with the head 34.

A yoke 81 is provided comprising a loop portion 82 having the ends of the loop outspread as at 83 and terminating in parallel portions 84 having formed therein notches 85. These parallel portions 84 are spaced apart a distance equal to the distance between the notches 77 of the plate 72. Formed in the opposite sides of the loop portions 82 are pairs of alined openings 86 and 87 for a purpose hereinafter to appear.

A second yoke 88 is provided having a loop portion similar to that of the yoke 81 with the exception of the fact that the arms 89 of the loop are more widely spaced. The outer ends of the arms 89 of the loop diverge as at 90 and terminate in parallel portions 91 spaced apart a distance equal to the distance between the notches 78 of the plate 72. The parallel portions are provided with notches 92 adapted to coact with the notches 78. Formed in the arms 89 of the yoke 88 is a pair of alined openings 93 for a purpose which will presently appear.

As clearly shown in Figures 3, 4 and 5 the plate 72 is secured to the head 34 and the yokes 81 and 88 arranged upon opposite sides of the portions 74 thereof with the notches of the yokes engaging in the notches 77 and 78. A transverse pin 94 extends through the openings 86 of the yoke 81 and a transverse pin 95 extends through the openings 93 of the yoke 88. The pin 94 receives one end 96 of a tension spring 97 and the pin 95 receives the other end 98 thereof. The openings 87 of the yoke 81 receive the transverse member 68 which communicates with the stems 52 and 67 of the valves.

An operating lever 99 is provided having formed upon its end spaced members 100 having formed therein notches 101 to receive the pin 95 upon opposite sides of the end 98 of the spring. The end of the lever 99 adjacent the spaced members 100 is provided with a notch 102 to allow a passage of the spring end 98. The lever 99 is reduced as at 103 thus forming shoulders 104 adjacent the end bearing the spaced members 100. This reduced portion is of such size as to slide easily in the bore 105 of the plug 32 but the shoulders 104 cannot enter this bore. The free end of the lever 99 is downbent as at 106 to prevent its withdrawal through the bore 105 of the plug 32 and it extends within the recess 31 of the member 29.

The operation of my device is as follows:

When the valves are in the position shown in Figure 8 the end 53 of the cylinder 10 is in communication with the source of suction through conduit 39, tubular member 38 passage 37 ports 36 and 40, groove 44 and bore 46. The opposite end 71 of the cylinder is in communication with the atmosphere through a bore 107, bore 55', port 57, groove 56, conduit 54' and conduits 69 and 70. The pistons accordingly move in a direction toward the end 53 of the cylinder. When the pistons arrive adjacent the end 53 the plug 32 engages the shoulders 104 of the lever 99 and forces the lever toward the head 34. As soon as the lever has been moved to a point when a line drawn through the pins 94 and 95 of the yokes 81 and 88 respectively passes between the pivotal point of the yokes and the head 34 the yoke 81 is shifted by the spring 97 and the valves are shifted to engage the seats previously disengaged.

When the valves are in this position the end 71 of the cylinder is in communication with the source of suction through passage 54, conduit 54' and conduits 69 and 70. The end 53 of the cylinder is in communication with the atmosphere through port 107 bore 55' and the longitudinal bore 60 of the plug 59. When the valves are in this position the pistons 27 and 29 move toward the head 33. Arriving adjacent the head 33 the down bent end 106 of the lever 99 engages against the inner end of the plung 32 and the yoke 88 is moved away from the head 34. As soon as the yoke 88 has been moved sufficiently that a line drawn through the pins 94 and 95 lies beyond the pivot point of the yokes 81 and 88 from the head 34, the spring 97 actuates the yoke 81 and returns the valves to the position shown in Figure 8.

It will be seen that the valves are not actuated until they are given a positive thrust by the spring 97 and that consequently these valves cannot assume a position intermediate their seats. There is no movement whatever of the yoke 81 until the spring has been brought to such a position as the actuation of the yoke is governed by the spring.

In assembling the device attention is drawn to the construction of the lever 99. This lever can only be inserted into its position by moving it through a line nearly parallel with the yoke 88. This is caused by the fact that the spaced portions are of such size that the notches 103 retain their grip upon the pin 95 after the lever has been moved back to a position in which it engages against the base of the yoke. It will be obvious that this construction lends rapidity of assembly and that after the parts of the device are in assembled position it is impossible for the lever 99 to become accidentally disengaged. The structure of the yokes 81 and 88 and the supporting plate 72 thereof is further more of such character as to allow the device to be readily assembled and disassembled. Attention is called to the fact that the limiting stop for the shifted yoke 88 is formed integrally with the base plate.

As many changes are possible in the shape, size and arrangement of the various parts herein shown, I do not limit myself to the specific structure above described but may make any such changes without departing from the spirit of the invention or the scope of the subjoined claims.

What I claim is:

1. Valve actuating mechanism for windshield cleaners having a cylinder, a reciprocating piston, and means for connecting said cylinder to a source of suction, said valve actuating mechanism comprising a shiftable valve, a pivoted valve supporting member, a spring connected thereto, a second pivoted member, said spring being connected to said second pivoted member, and means actuated by the movement of the piston for shifting the end of said spring to opposite sides of the pivot point of the pivoted supporting member.

2. In a motor for windshield cleaners, a cylinder, a member reciprocable therein, means for alternately connecting opposite ends of the cylinder to a source of suction comprising a conduit, a valve arranged therein, a member connected thereto, a pivoted yoke connected to said member, a spring connected at one end to said yoke, a second pivoted yoke, the opposite end of the spring being connected thereto, and means operated by the movement of the reciprocable member for shifting the second named end of said spring to opposite sides of the pivot point of the first yoke.

3. In an operating motor for windshield cleaners, a cylinder, a reciprocating piston mounted therein, a valve adapted to alternately place the opposite ends of the cylinder in communication with a source of suction, a valve supporting member mounted in said cylinder, said member being provided with a pair of parallel arms having offset ends, said offset ends being provided with notches, a member having a pair of arms, the ends of which are received in said notches to pivotally support said member, a spring having one end secured thereto, means connected with the free end of said spring for maintaining it under tension, and means operated by the movement of the piston to shift the free end of said spring to opposite sides of the pivot point of said pivoted member.

4. In an operating motor for windshield cleaners, a cylinder, a member reciprocable therein, a valve to alternately place the opposite ends of the cylinder in communication with a source of suction, a supporting member secured to the cylinder, a yoke pivotally mounted thereon, said valve being connected to said yoke, a second pivoted yoke mounted on said supporting member, a spring connected to said yokes, and means operated by the movement of the reciprocable member for shifting one end of said spring to opposite sides of the pivot point of the first yoke.

5. In an operating motor for windshield cleaners, a cylinder, a reciprocating piston mounted therein, a valve adapted to alternately place the opposite ends of the cylinder in communication with a source of suction, a supporting member mounted in said cylinder, said member comprising a base portion, and a pair of substantially parallel arms, said arms being provided with offset ends, said offset ends being provided with oppositely arranged notches, a pair of yokes arranged in said notches to pivotally support them, the valve being connected to one of said yokes, a spring connecting said yokes, and means operated by the movement of the piston to shift the second yoke to opposite sides of the pivot point of said yoke to which the valve is connected.

6. Valve actuating mechanism for windshield cleaners having a cylinder, a movable member therein, and means for connecting said cylinder to a source of suction, said valve actuating mechanism comprising a shiftable valve, a valve supporting member comprising a pair of pivoted arms having their pivots arranged adjacent each other and their outer ends remote from each other, a tension spring connected to each of said arms adjacent their outer ends, means for operatively connecting said valve to one of said arms, and means actuated by the movement of the movable member for moving the other arm and shifting the spring to opposite sides of the pivot of the first arm.

7. Valve actuating mechanism for windshield cleaners having a cylinder, a member adapted to be reciprocated in said cylinder by differential pressure, and means for connecting said cylinder to a source of suction, said valve actuating mechanism comprising a shiftable valve, a pair of pivoted yokes mounted in said cylinder, said yokes having their pivots arranged adjacent each other and their outer ends remote from each other, a tension spring secured to each of said yokes adjacent the outer ends of the yokes, means for operatively connecting said valve to one of said yokes, and means actuated by the reciprocation of said member for moving the outer end of the other yoke and shifting the spring to opposite sides of the pivot of the first yoke.

8. Valve actuating mechanism for windshield cleaners having a cylinder, a member adapted to be reciprocated in said cylinder by differential pressure, and means for connecting said cylinder to a source of suction, said valve actuating mechanism comprising a shiftable valve adapted to establish communication between either end of said cylinder and the source of suction, a supporting member mounted in said cylinder, a pair of arms pivotally mounted on said supporting member, said arms having their pivots arranged adjacent each other and their outer ends remote from each other, a tension spring connected to each of said arms adjacent its outer end, means for operatively connecting said valve to one of said arms, and means operable by the reciprocation of said movable member for moving the outer end of the other arm and shifting the spring to opposite sides of the pivot of the first arm.

9. Valve mechanism for windshield cleaners having a cylinder, a member adapted to be reciprocated in said cylinder by differential pressure, and means for connecting said cylinder to a source of suction, said valve mechanism comprising a valve adapted to place either end of said cylinder in communication with the source of suction, a supporting member mounted in said cylinder, said supporting member being provided with a pair of substantially parallel arms, a pair of yokes pivotally mounted on said arms, said pivots being arranged adjacent to each other and the outer ends of said yokes being arranged remote from each other, a spring having one end secured to each of said yokes adjacent its outer end, means for operatively connecting said valve to one of said yokes, and means operated by the reciprocation of the movable member for moving the outer end of the other yoke and shifting the spring to opposite sides of the pivot of the first yoke.

10. Valve actuating mechanism for windshield cleaners having a cylinder, a member adapted to be reciprocated in said cylinder by differential pressure, and means for connecting said cylinder to a source of suction, said valve mechanism comprising a shiftable valve adapted to connect either end of said cylinder to a source of suction, a supporting member mounted in said cylinder, said supporting member being provided with a pair of substantially parallel arms having offset ends, a pair of yokes pivotally mounted on opposite ends of said arms and extending in opposite directions, a spring having one end connected to each of said yokes adjacent the outer ends of the yokes, means for operatively connecting said valve to one of said yokes, and means for moving the outer end of the other yoke and shifting said spring to opposite sides of the pivot of the first yoke.

11. Valve mechanism for windshield cleaners having a cylinder, a movable member mounted in said cylinder, and means for connecting said cylinder to a source of suction, said valve mechanism comprising a shiftable valve adapted to place either end of said cylinder in communication with the of said cylinder in communication with the source of suction, a supporting member mounted in said cylinder, said supporting member being provided with a pair of substantially parallel arms having offset ends, the opposite ends being provided with notches, yokes pivotally mounted in said notches and extending in opposite directions, a tension spring connected to said yokes adjacent their outer ends, means for operatively connecting said valve to one of said yokes, and means operated by the movement of said member for moving the outer end of the other yoke and shifting the spring to opposite sides of the pivot of the first yoke.

12. Valve mechanism for windshield cleaners having a cylinder, a movable member mounted in said cylinder, and means for connecting said cylinder to a source of suction, said valve mechanism comprising a shiftable valve adapted to place either end of said cylinder in communication with the source of suction, a supporting member mounted in said cylinder, said supporting member being provided with a pair of substantially parallel arms having offset ends, the offset ends being provided with notches, yokes pivotally mounted in said notches and extending in opposite directions, a tension spring connected to said yokes adjacent their outer ends, means for operatively connecting one of said yokes to said valve, means operated by the movement of said member for moving the outer end of the other yoke and shifting the spring to opposite sides of the pivot of the first yoke, and means carried by said supporting member to engage the first yoke to limit its movement.

13. Valve mechanism for windshield cleaners having a substantially air-tight casing, an actuating member mounted in said casing and adapted to be actuated by differential pressure, means for connecting said casing to a source of suction, said valve mechanism comprising a shiftable valve adapted to place the interior of said casing on opposite sides of said member in communication with the source of suction, a pair of pivoted arms mounted in said casing, said arms having their pivots arranged adjacent each other and their outer ends remote from each other, means for operatively connecting said valve to one of said arms, a tension spring secured to each of said arms adjacent the outer ends of said arms, and means operable by the movement of said actuating member to move the outer end of the other arm and shift said spring to opposite sides of the pivot of the first arm.

14. A motor for windshield cleaners comprising a cylinder having a relatively large opening therein through which access may be had to the interior of said cylinder, a closure plate adapted to be secured in position over said opening, said closure plate being provided with a pair of passages, one of which is open to the atmosphere, a conduit connecting the other passage to a source of suction, a piston in said cylinder adapted to be reciprocated by differential pressure within the cylinder, valve seats in each of said passages in said closure plate, valves cooperating with said seats, valve actuating mechanism carried on the inner side of said closure plate, and means operated by the movement of the piston for controlling said valve actuating mechanism to alternately place each end of said cylinder in communication with said conduit and the opposite end in communication with the atmosphere.

15. A motor for windshield cleaners comprising a cylinder having a relatively large opening therein through which access may be had to the interior of said cylinder, a closure plate bored to provide therein a pair of passages, one of which is open to the atmosphere, a conduit connecting the other passage to a source of vacuum production, means for securing said closure plate in position over said opening, a piston in said cylinder adapted to be reciprocated by differential pressure within the cylinder, valve seats adjacent each of said passages bored in said closure plate, valves cooperating with said seats, valve actuating mechanism carried on the inner side of said closure plate, and means operated by the movement of the piston for controlling said valve actuating mechanism to alternately place each end of said cylinder in communication with said conduit and the opposite end in communication with the atmosphere.

16. A motor for windshield cleaners comprising a cylinder having a relatively large opening therein through which access may be had to the interior of the cylinder, a closure plate adapted to be secured in position over said opening, said closure plate being provided with a pair of passages, one of which is open to the atmosphere, a conduit connecting the other passage to a source of suction, a manually operable control valve for controlling said passage connected to said conduit, a piston in said cylinder, valve seats formed in each of said passages in said closure plate, valves cooperating with said seats, elastically controlled valve actuating mechanism carried on the inner side of said closure plate and adapted to be locked in each of two positions against the resistance of the said elastic means, and means operated by the movement of the piston for shifting the said valve actuating mechanism whereby said elastic means will become effective to shift the said valves from one position to their opposite position.

17. A motor for windshield cleaners comprising a cylinder having a relatively large opening therein through which access may be had to the interior of the cylinder, a closure plate adapted to be secured in position over said opening, said closure plate being provided with a pair of passages, one of which is open to the atmosphere, a conduit connecting the other passage to a source of suction, valves for controlling said passages, a piston in said cylinder, valve seats formed in each of said passages in said closure plate, the valve mechanism cooperating with said seats, elastic means for controlling the movement of said valve mechanism whereby said valve mechanism will be held in its respective limits of movement, under tension, and means operated by the movement of the piston for shifting the said elastically controlled means whereby to operate the valve.

In testimony whereof I affix my signature in presence of two witnesses.

WILLIAM M. FOLBERTH.

Witnesses:
ERWIN HENRY EHLERT,
MAXWELL F. FOURNIER.